US009430812B2

(12) United States Patent
Chang

(10) Patent No.: US 9,430,812 B2
(45) Date of Patent: Aug. 30, 2016

(54) IMAGE PROCESSING METHOD, IMAGE OUTPUT PROCESSING METHOD, AND IMAGE RECEPTION PROCESSING METHOD

(71) Applicant: REALTEK SEMICONDUCTOR CORPORATION, Hsinchu (TW)

(72) Inventor: Cheng Hsin Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 355 days.

(21) Appl. No.: 14/017,794

(22) Filed: Sep. 4, 2013

(65) Prior Publication Data

US 2014/0071169 A1 Mar. 13, 2014

(30) Foreign Application Priority Data

Sep. 12, 2012 (TW) .............................. 101133384 A

(51) Int. Cl.
G09G 5/00 (2006.01)
G06T 3/40 (2006.01)

(52) U.S. Cl.
CPC .............. *G06T 3/40* (2013.01); *G06T 3/4092* (2013.01)

(58) Field of Classification Search
None
See application file for complete search history.

(56) References Cited

U.S. PATENT DOCUMENTS

| 8,477,841 | B2 | 7/2013 | Peng et al. | |
|---|---|---|---|---|
| 2008/0266580 | A1* | 10/2008 | Choi | G06T 3/40 358/1.2 |
| 2009/0147130 | A1* | 6/2009 | Kim | G09G 5/003 348/383 |
| 2011/0170802 | A1* | 7/2011 | Liu | H04N 21/440272 382/298 |
| 2011/0216975 | A1* | 9/2011 | Rother | G06K 9/34 382/173 |
| 2013/0077887 | A1* | 3/2013 | Elton | G06T 3/4053 382/264 |

FOREIGN PATENT DOCUMENTS

| CN | CN101365077 A | 2/2009 |
|---|---|---|
| CN | CN102611869 A | 7/2012 |
| TW | 201026069 A1 | 7/2010 |

OTHER PUBLICATIONS

Office Action of the counterpart CN application 2012104718093 dated May 4, 2016.
English abstract translation of the Office Action of the counterpart CN application 2012104718093 dated May 4, 2016.
English abstract translation of CN102611869A.
CN101365077A is also published as US20111070802A1.

(Continued)

*Primary Examiner* — Peter Hoang
(74) *Attorney, Agent, or Firm* — WPAT, P.C., Intellectual Property Attorneys; Anthony King

(57) ABSTRACT

The present invention discloses an image processing method comprising: using an image output device to generate a scale-down image; using the image output device to generate a plurality of divided images according to the scale-down image; using the image output device to encode the plurality of divided images to thereby generate a plurality of encoded images; having the image output device output the plurality of encoded images into an image reception device through a transmission interface; using the image reception device to decode the plurality of encoded images to thereby recover the plurality of divided images; using the image reception device to generate a combined image according to the plurality of divided images; and using the image reception device to generate a display image according to the combined image, in which the size of the display image is larger than the size of the combined image.

33 Claims, 12 Drawing Sheets

(56) References Cited

OTHER PUBLICATIONS

Office Action of the counterpart TW application No. 101133384 dated Jun. 13, 2016.

Search report of the counterpart TW application No. 101133384 dated Jun. 13, 2016.
English abstract translation of the Office Action of the counterpart TW application No. 101133384 dated Jun. 13, 2016.
TW 201026069 A1 corresponds to U.S. Pat. No. 8,477,841.

* cited by examiner

IMAGE PROCESSING METHOD, IMAGE OUTPUT PROCESSING METHOD, AND IMAGE RECEPTION PROCESSING METHOD

BACKGROUND OF THE INVENTION

1. Field of the Invention

The present invention relates to an image processing method, especially to a method which can process an image in consideration of limited processing capability.

2. Description of Related Art

As the sizes of television and monitor panels increase day by day, the so-called high definition image (such as an image with 2K1K or FHD (Full High Definition) resolution) will not be enough for future demand. In fact, the requirement for images with higher resolution (such as images with 4K2K or QFHD (Quad Full High Definition) resolution) is already increased nowadays. However, as the image resolution increases, the general television or monitor processing chip (which could be a single chip or a bundle of multi chips) will be short of dealing with such high resolution images, which means that a chip that can handle 2K1K or FHD images will become useless when it faces 4K2K or QFHD images. Consequently, an expensive chip that can take care of the high resolution images should be used to replace the general image processing chip, which leads to a high cost solution.

SUMMARY OF THE INVENTION

Regarding the aforementioned drawbacks, an object of the present invention is to provide an image processing method to solve the problems in the prior art.

Another object of the invention is to provide an image output processing method to process a source image for output in consideration of the processing capability of a reception device.

A further object of the present invention is to provide an image reception processing method to handle extra high-definition images by limited processing capability.

The present invention discloses an image processing method for processing a source image in consideration of limited processing capability. The image processing method is realized by an image processing system which comprises an image output device, a transmission interface and an image reception device. According to an embodiment, the image processing method comprises: using the image output device to generate a scale-down image with the size smaller than that of the source image; using the image output device to generate a plurality of divided images according to the scale-down image while each of the divided images has the size smaller than that of the scale-down image; using the image output device to generate a plurality of encoded images according to the plurality of divided images; having the image output device output the plurality of encoded images to the image reception device through the transmission interface; using the image reception device to decode the plurality of encoded images to thereby recover the plurality of divided images; and using the image reception device to generate a display image according to the plurality of divided images in which the size of the display image is larger than the size of any of the divided images.

The present invention further provides an image output processing method for processing a source image for output. The image output processing method is realized through an image output device. According to an embodiment of the present invention, the image output processing method comprises: using the image output device to generate a scale-down image with the size smaller than that of the source image; using the image output device to generate a plurality of divided images according to the scale-down image while each of the divided images has the size smaller than that of the scale-down image; using the image output device to generate a plurality of encoded images according to the plurality of divided images; and having the image output device output the plurality of encoded images to an image reception device through a transmission interface.

The present invention also provides an image reception processing method for receiving and processing a plurality of encoded images from an image output device. The plurality of encoded images is derived from a source image, and the image reception processing method is realized through an image reception device. According to an embodiment of the present invention, the image reception processing method comprises: using the image reception device to decode the plurality of encoded images to recover a plurality of divided images; using the image reception device to generate a combined image or a plurality of enlarged images according to the plurality of divided images; and using the image reception device to enlarge the combined image or combine the plurality of enlarged images to thereby generate a display image or assist in generating the display image.

According to another embodiment of the present invention, the image processing method comprises: using an image output device to generate a plurality of divided images according to a source image while each of the divided images has incomplete horizontal and/or vertical image lines in comparison with the source image; using the image output device to generate a plurality of encoded images according to the plurality of divided images; having the image output device output the plurality of encoded image to an image reception device through a transmission interface; using the image reception device to decode the plurality of encoded images to thereby recover the plurality of divided images; and using the image reception device to generate a display image according to the plurality of divided images.

According to another embodiment of the present invention, the image output processing method comprises: using an image output device to generate a plurality of divided images according to a source image while each of the divided images has incomplete horizontal and/or vertical image lines in comparison with the source image; using the image output device to generate a plurality of encoded images according to the plurality of divided images; and having the image output device output the plurality of encoded image to an image reception device through a transmission interface.

According to another embodiment of the present invention, the image reception processing method comprises: using an image reception device to decode a plurality of encoded images to obtain a plurality of divided images; using the image reception device to detect whether the plurality of encoded images or divided images includes an identification, or having the image reception device receive the identification from an image output device, wherein the identification represents an image output processing method; and if the identification is detected or received, having the image reception device process the plurality of divided images in consideration of the image output processing method, so as to generate a display image.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
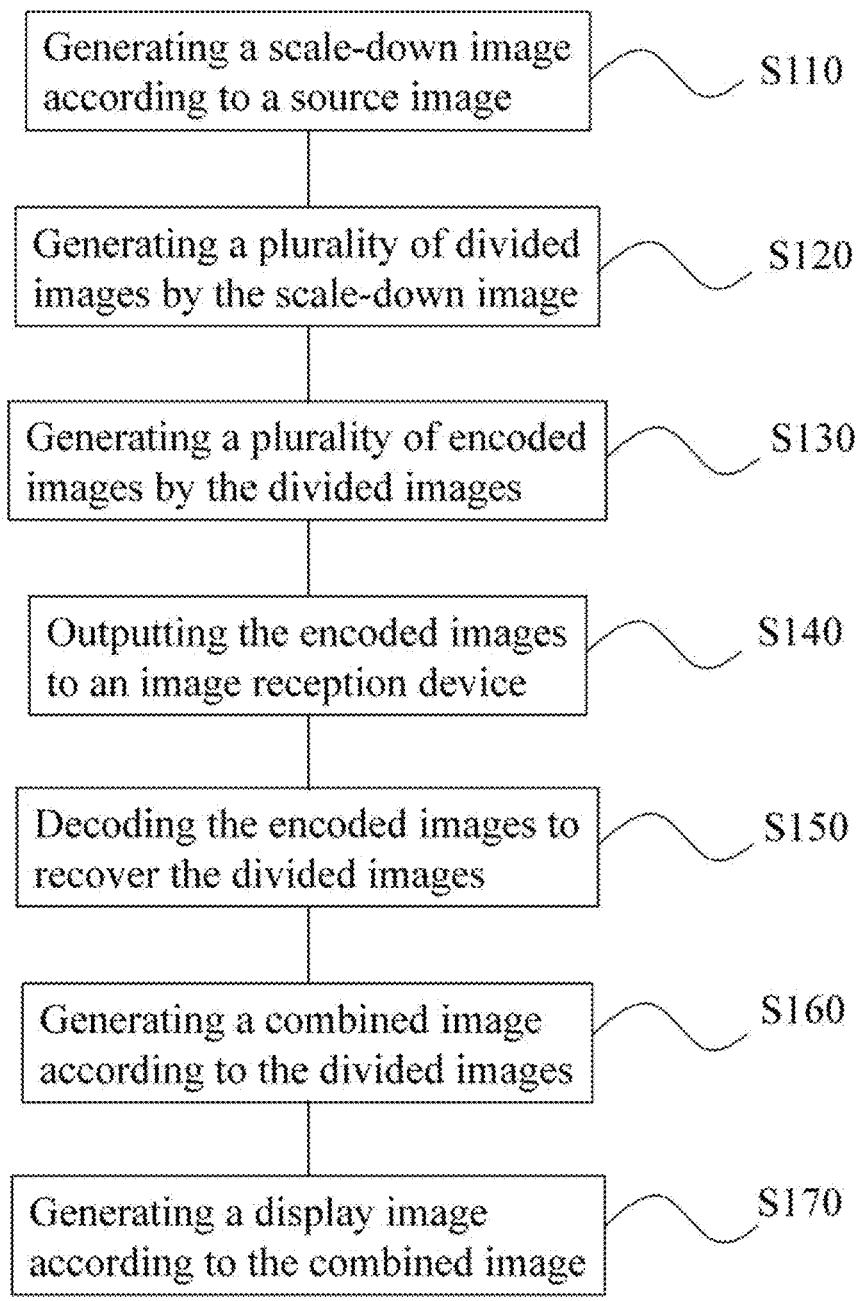
FIG. 1 illustrates an embodiment of the image processing method of the present invention.

The following description uses language by referring to terms of the filed of this invention. If any term is defined in the specification, such term should be explained accordingly. Besides, the connection between objects or events in the disclosed embodiments can be direct or indirect provided that these embodiments are still applicable under such connection. The mentioned "indirect" means that an intermediate object or a physical space is existed between the objects, or an intermediate event or a time interval is existed between the events. In addition, the following description relates to image processing methods and the known detail in this filed will be omitted if such detail has nothing to do with the features of the present invention. Furthermore, the shape, size, and ratio of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all of the features in several embodiments to make the implementation come true, so as to increase the flexibility of carrying out the present invention.

The present invention discloses an image processing method for processing a source image in consideration of the processing capability of an image reception device. The method can be carried out by an image processing system which comprises: an image output device (e.g. a computer, a multimedia player or a mobile computing device); a transmission interface (e.g. a USB interface, an HDMI interface or a wireless transmission interface in compliance with a 802.11 standard); and an image reception device (e.g. a television or a monitor, a scaler and its co-working timing controller comprised in a television or a monitor, or just a scaler). The image processing method comprises an image output processing method and an image reception processing method. The image output processing method can be carried out by the aforementioned image output device while the image reception processing method can be performed by the aforementioned image reception device. Since this invention relates to a method and the hardware device (e.g. the aforementioned image processing system or a component therein) for realizing the method can be but not limited to a known device or known components assembled in accordance with the invention disclosure, the detail of the hardware device will be omitted provided that such omission nowhere dissatisfies the specification and enablement requirements.

Please refer to FIG. 1 which illustrates the flow chart of an embodiment of the image processing method of the present invention. The embodiment is applicable to a motion image (e.g. a video image or a television image) and also applicable to a still image (e.g. a picture). In principle, any kind of images with which could be dealt by this embodiment is within the implementation scope of the present invention. As shown in FIG. 1, the image processing method comprises the following steps:

Step S110: using an image output device to generate a scale-down image (e.g. an image with 4K1K resolution in which 4K1K is a term meaning that there are approximate 4000 pixels in width and approximate 1000 pixels in height while the later terms 4K2K, 2K1K have similar definition) according to a source image (e.g. an image with 4K2K or QFHD (quad full high-definition) resolution), wherein the scale-down image has the size (e.g. the amount of pixels) smaller than that of the source image. In this embodiment, the size of the scale-down image is the half size of the source image.

Step S120: using the image output device to generate a plurality of divided images (e.g. plural images with 2K1K resolution) according to the scale-down image in which each of the divided images has the size smaller than that of the scale-down image. In the present embodiment, the size of each divided image is the half size of the scale-down image; however, other size ratios could be applicable.

Step S130: using the image output device to generate a plurality of encoded images according to the divided images. In the present embodiment, the image output device compresses the divided images by a compression algorithm to thereby generate the encoded images. The compression algorithm can be a known or new algorithm for compressing the divided images to produce a compressed file or compressed data, which means that the compressed file or data will contain the encoded images.

Step S140: having the image output device output the plurality of encoded images to an image reception device through a transmission interface. In this embodiment, the transmission interface is a wired transmission interface such as a USB interface; however, other wired or wireless interfaces could be applicable.

Step S150: using the image reception device to decode the plurality of encoded images to thereby recover the plurality of divided images. In the present embodiment, the image reception device decompresses the aforementioned compressed file or data containing the encoded images to get the divided images back.

Step S160: using the image reception device to generate a combined image according to the plurality of divided images. In this embodiment, the combined image has the size equal to or smaller than the size of the aforementioned scale-down image.

Step S170: using the image reception device to generate a display image according to the combined image. In the present invention, since the size of the combined image is equal to or smaller than the size of the scale-down image, the image reception device will enlarge the combined image to make the display image with a size the same as or close to the size of the source image. However, because step S110 performed a scale-down process to the source image to obtain the scale-down image, the later generated display image derived from the scale-down image will therefore contain less image details in comparison with the source image.

The above-mentioned steps S160 and S170 can be comprised in one step S158, which means that step S158 covers a scope encompassing the implementation scope defined by steps S160 and S170. More specifically, step S158 includes: using the image reception device to generate a display image according to the plurality of divided images. In sum, step S158 takes all implementation possibilities of steps S160 and S170 into consideration. For instances, step S158 uses the image reception device to generate the combined image or a plurality of enlarged images according to the divided images; and then enlarges the combined image or combines the plurality of enlarged images to generate the aforementioned display image, or assists a following procedure in producing the display image. The following procedure could be a step of adding black bars to the combined image or the enlarged images, or any known or new image processing step.

Please note that the above-described specific examples (e.g. the size of the scale-down image or the divided image, the type of the transmission interface, the encoding or decoding algorithm, the size of the combined or display image, and etc.) are for understanding, not for setting a limitation to the present invention. In other words, a person of ordinary skill in the art can reasonably and duly derive more examples equivalent to the mentioned examples based on the disclosure in the specification. These derived examples should be within the scope of the present invention if no restriction is brought up in this specification.

Figure 2A:
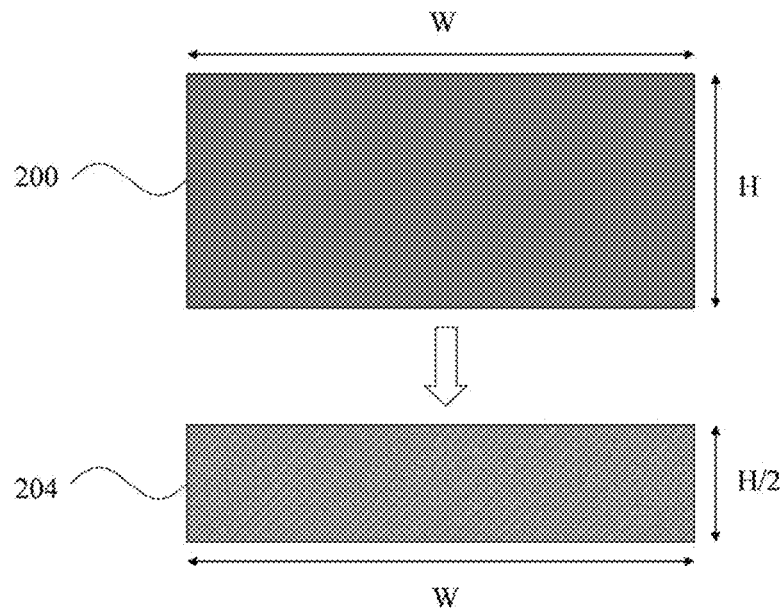
FIG. 2a illustrates an embodiment of the present invention about reducing a source image to a scale-down image.

Please refer to FIG. 1 again. Step S110 may further comprise: reducing at least one of the width and height of the source image according to an image reduction rule, so as to generate the scale-down image. As shown in FIG. 2a, in the present embodiment, step S110 generates the scale-down image 204 by reducing the height of the source image 200. The mentioned image reduction rule can comprise a step of selecting partial image lines (e.g. horizontal scanning lines) of the source image to generate the scale-down image, for instance: a step of selecting odd or even number image lines to generate the scale-down image; or the image reduction rule can comprise a step of using partial or all image lines of the source image to generate the scale-down image according to an interpolation rule, for instance: a step of using three sequential image lines (e.g. the first to third horizontal scanning lines) to produce a substitute image line through the interpolation rule with given weights or ratios over these sequential lines, then using other three sequential horizontal image lines (e.g. the third to fifth horizontal scanning lines) to produce another substitute image line through the interpolation rule with given weights or ratios over the three sequential lines, and so on to generate enough substitute image lines for constituting the scale-down image. The size of the scale-down image could be a half, one over two to the power of n (while n is an integer), or a self-decided ratio of the size of the source image.

Additionally, step S110 can further comprise a step of determining a reduction ratio or manner according to a parameter related to the processing capability of the aforementioned image reception device (e.g. the capability of a scaler in the image reception device) for generating the scale-down image. For example, when the parameter indicates that the processing capability of the image reception device is lower than a predetermined threshold, step S110 will accordingly raise the reduction ratio to thereby generate a further scale-down image, which guarantees that the image reception device can properly handle the further scale-down image. Moreover, to make sure that the size of the source image conforms to a normal or predetermined size, the image processing method of this invention can further have the aforementioned image output device trim or resize an original image according to a display size of the image reception device to thereby produce the source image under the normal or predetermined size.

Figure 2B:
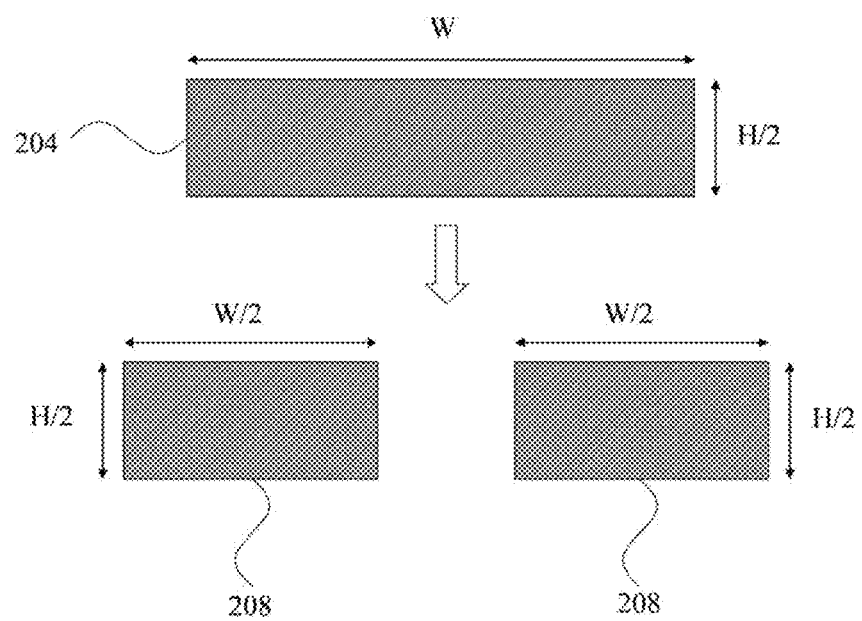
FIG. 2b illustrates an embodiment of dividing the scale-down image of FIG. 2a into a plurality of divided images.
Figure 3A:
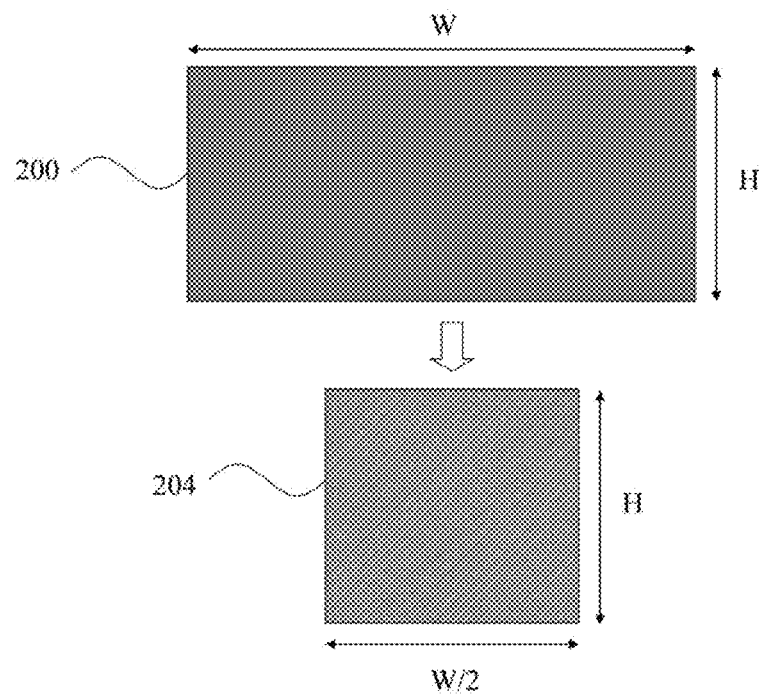
FIG. 3a illustrates another embodiment of the present invention about reducing a source image to a scale-down image.
Figure 3B:
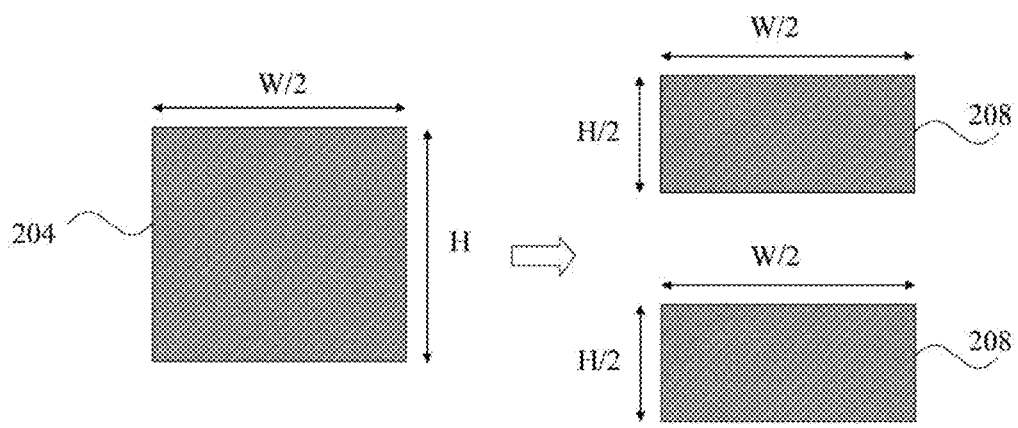
FIG. 3b illustrates an embodiment of dividing the scale-down image of FIG. 3a into a plurality of divided images.

Please refer to FIG. 1 again. Step S120 can comprise: generating the plurality of divided images according to a plurality of image sections of the scale-down image. For example, step S120 can generate one or more first divided images according to a first image section of the scale-down image; and generate one or more second divided images according to a second image section of the scale-down image, wherein the size summation of these divided images is equivalent to or different from the size of the scale-down image, and each of the divided images has a plurality of incomplete image lines (e.g. incomplete horizontal scanning lines) in comparison with the scale-down image. To be more specific, as shown in FIGS. 2a and 2b, when step S110 reduces the height of the source image 200 to generate the scale-down image 204 (shown in FIG. 2a), step S120 correspondingly divides the scale-down image 204 into a left-half 208 and a right-half 208 (shown in FIG. 2b) to thereby generate the plurality of divided images 208; meanwhile, compared with the scale-down image 204, each of the divided images 208 has a plurality of incomplete image lines in the horizontal direction, which implies that compared with the source image 200, each divided image 208 has incomplete image lines in the horizontal and vertical directions. Similarly, as shown in FIGS. 3a and 3b, if step S110 reduces the width of the source image 200 to generate the scale-down image 204 (shown in FIG. 3a), step S120 correspondingly divides the scale-down image 204 into an upper-half 208 and a lower-half 208 (shown in FIG. 3b) to generate the divided images 208; meanwhile, compared with the scale-down image 204, each of the divided images 208 has a plurality of incomplete image lines in the vertical direction, which implies that compared with the source image 200, each divided image 208 has a plurality of incomplete image lines in the vertical and horizontal directions.

Besides, because image artifacts may be produced during the encoding, transmission, decoding and combination processes of steps S130, S140, S150 and S160 and thereby lead to a visual discontinuous at the combination border of the combined image derived from the divided images, the present invention therefore provides another embodiment which preserves an overlapped section that can be removed when executing step S160, so as to remove the portion probably containing the image artifacts. Please refer to FIGS. 4a to 4d in which FIG. 4a relates to FIG. 4b while FIG. 4c relates to FIG. 4d. In this embodiment, step S120 comprises the following steps.

Figure 4A:
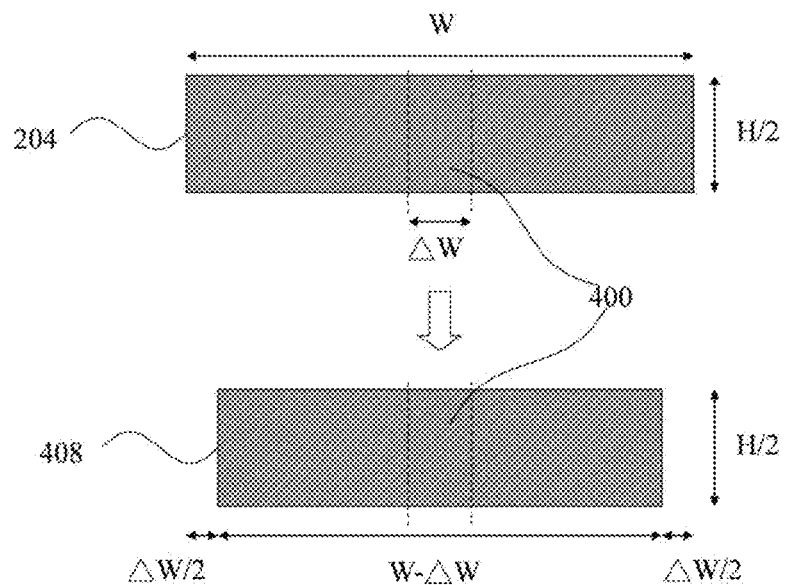
FIG. 4a illustrates an embodiment of the present invention about reducing a scale-down image to a division-awaited image.
Figure 4B:
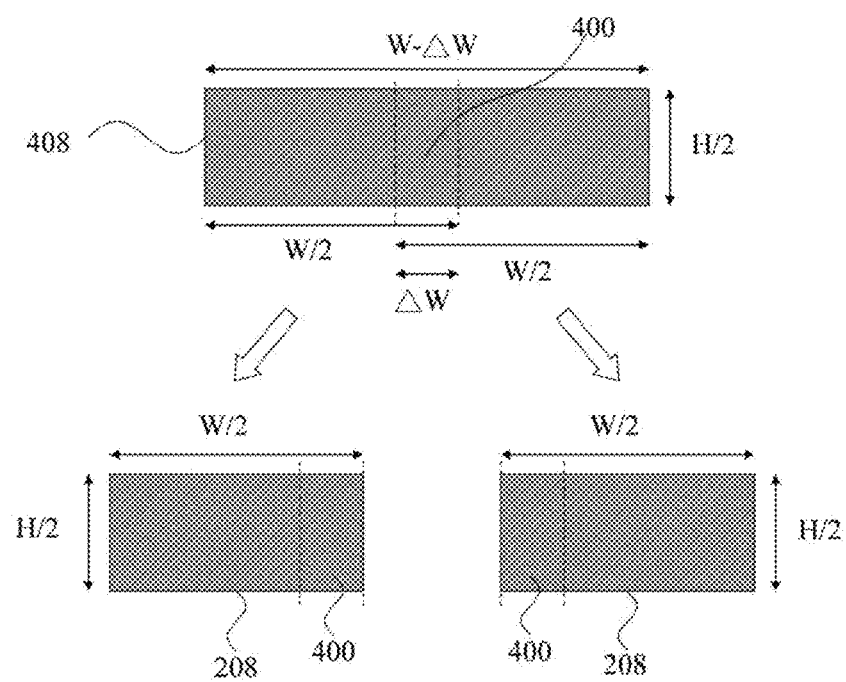
FIG. 4b illustrates an embodiment of dividing the division-awaited image of FIG. 4a into a plurality of divided images.
Figure 4C:
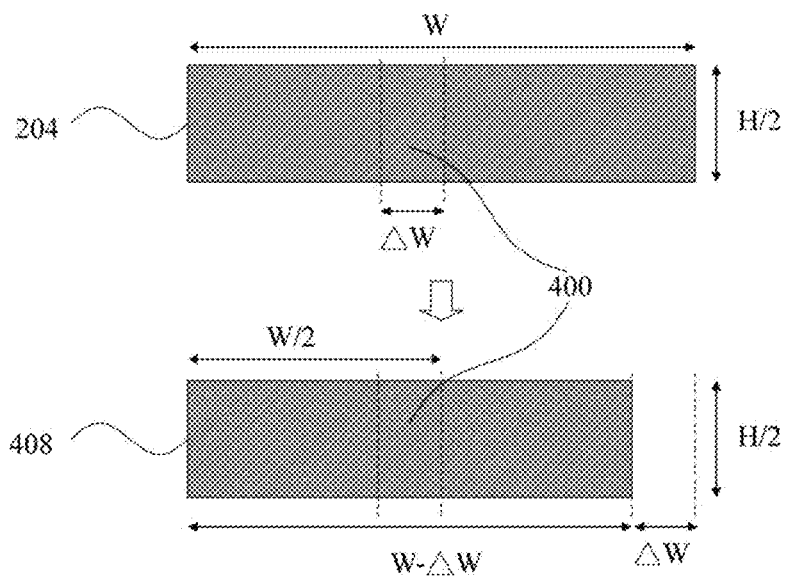
FIG. 4c illustrates another embodiment of the present invention about reducing a scale-down image to a division-awaited image.

Step S122: reducing the scale-down image in accordance with the size of a predetermined overlapped section 400 in which the size can be represented by $\Delta W \times H/2$ ($\Delta W$: the width of the predetermined overlapped section 400; H/2: the height of the predetermined overlapped section 400 and also the height of the scale-down image 204), so as to obtain a division-awaited image 408. The division-awaited image 408 has the size equivalent to the value of subtracting the size of the overlapped section 400 from the size of the scale-down image 204 (i.e. $(W-\Delta W) \times H/2$ in which W stands for the width of the scale-down image 204). For example, step S122 cuts the two sides of the scale-down image 204 off by the half size of the predetermined overlapped section 400 (i.e. $(\Delta W/2) \times H/2$) respectively, which means that step S122 totally cuts the scale-down image 204 by the size of the overlapped section 400 off to thereby obtain the division-awaited image 408 (as shown in FIG. 4a). In another example, step S122 cuts one side of the scale-down image 204 off by the size of the predetermined overlapped image 400 ($\Delta W \times H/2$) to obtain the division-awaited image 408 (as shown in FIG. 4c). In yet another example, except the way of cutting, step S122 reduces the width of the scale-down image 204 from W to (W−ΔW) by an image reduction rule (e.g. any known reduction algorithm) to thereby get the division-awaited image (not shown).

Figure 4D:
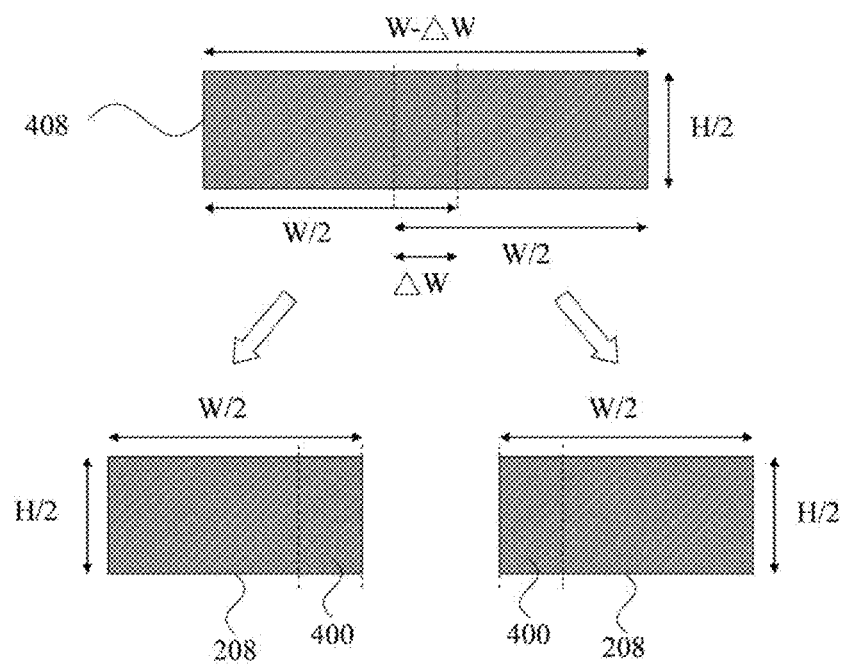
FIG. 4d illustrates an embodiment of dividing the division-awaited image of FIG. 4c into a plurality of divided images.

Step S124: generating a plurality of divided images 208 according to the division-awaited image 408 and the predetermined overlapped section 400, wherein the overlapped section 400 could be located at the lateral or vertical middle of the division-awaited image 408 while each of the divided images 208 should contain a part or the whole of the overlapped section 400. For instance, as shown in FIGS. 4b and 4d, step S124 takes the right edge of the division-awaited image 408 as a datum line and cuts the division-awaited image 408 along the line parallel to the datum line by W/2 distance, so as to obtain a divided image 208 with the half size of the scale-down image 204; similarly, step S124 also takes the left edge of the division-awaited image 408 as another datum line and cuts the division-awaited image 408 along the line parallel to the datum line by W/2 distance, so as to obtain another divided image 208 with the half size of the scale-down image 204. Consequently, the size summation of the two divided images 208 will be equivalent to the size of the scale-down image, and each of the two divided images 208 includes the predetermined overlapped section 400.

Figure 5A:
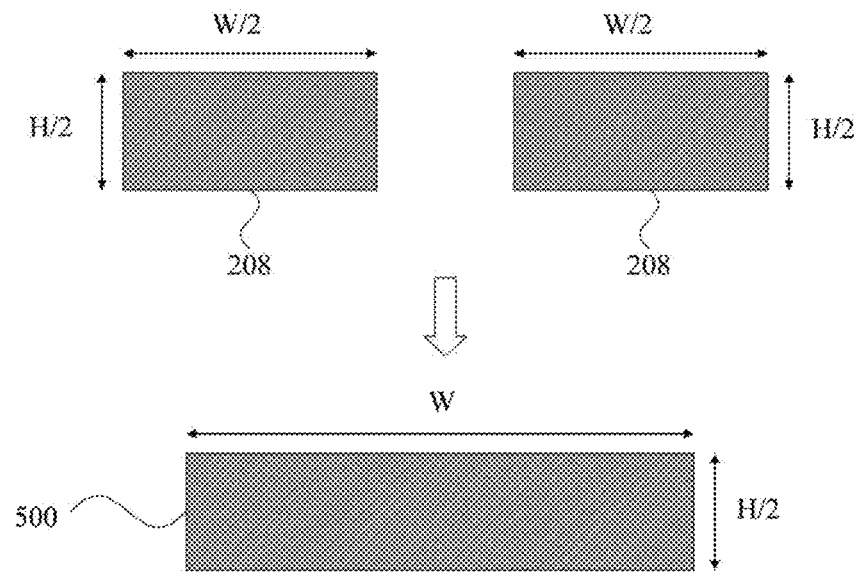
FIG. 5a illustrates an embodiment of combining the plurality of divided images of FIG. 2b to generate a combined image.
Figure 5B:
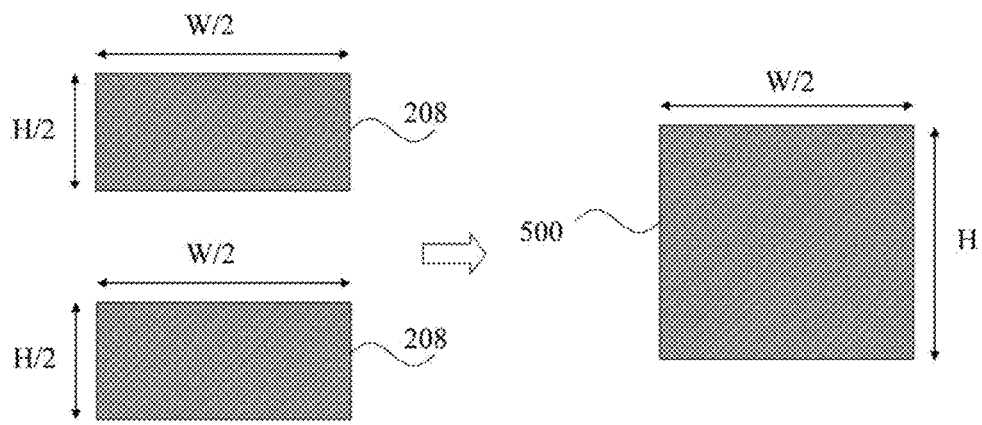
FIG. 5b illustrates an embodiment of combining the plurality of divided images of FIG. 3b to generate a combined image.
Figure 6A:
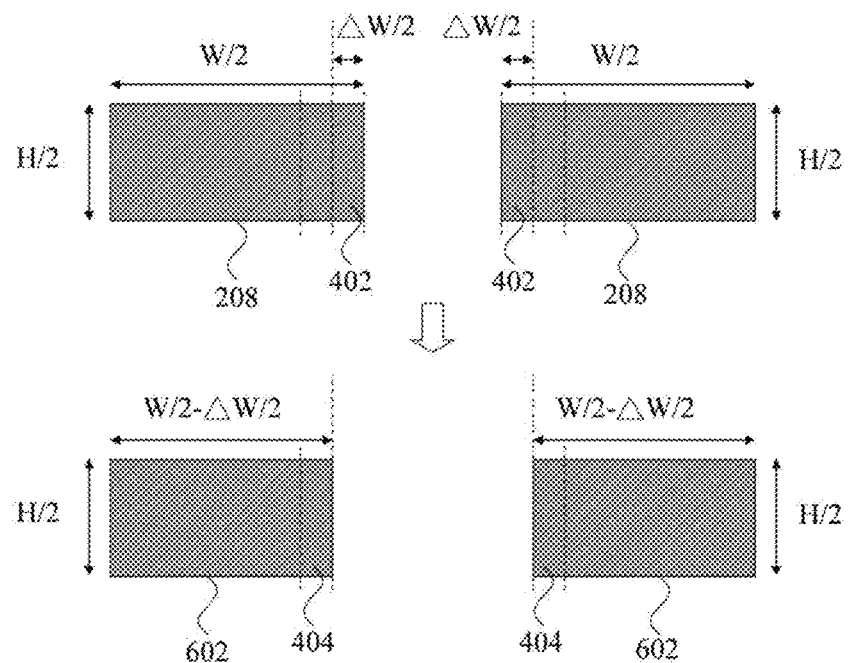
FIG. 6a illustrates an embodiment of the present invention about trimming a plurality of divided images to generate a plurality of combination-awaited images.
Figure 6B:
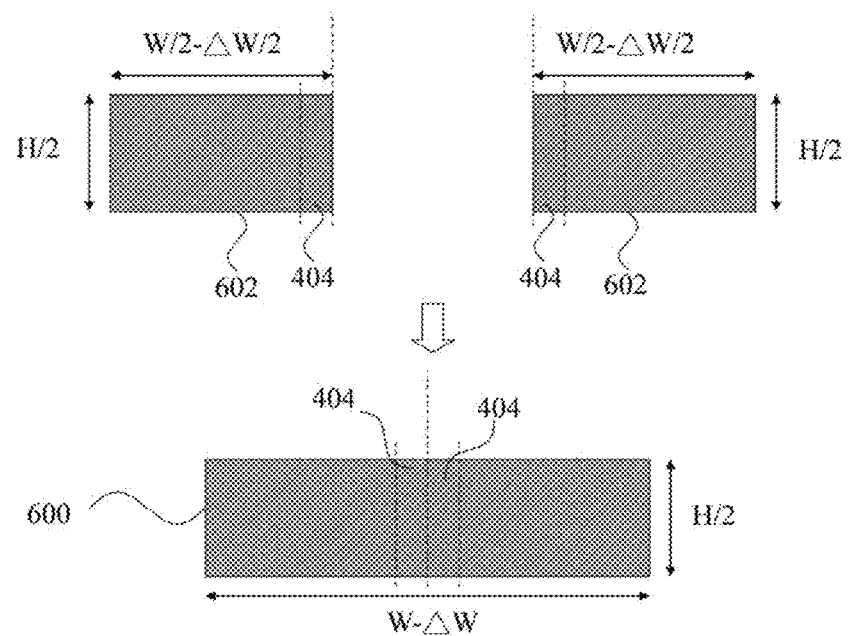
FIG. 6b illustrates an embodiment of combining the combination-awaited images of FIG. 6a to generate a combined image.

Please refer to FIG. 1 again. Step S160 can comprise: generating the combined image in consideration of the way for step S120 generating the plurality of divided images. More specifically, as shown in FIGS. 5a to 6b, when step S120 directly divides the scale-down image 204 into a left half and a right half as the plurality of divided images 208 (as shown in FIG. 2b), step S160 directly combines the two divided images 208, i.e. the left half and the right half, to thereby obtain the combined image 500 (as shown in FIG. 5a); when step S120 directly divides the scale-down image 204 into an upper half and a lower half as the plurality of divided images 208 (as shown in FIG. 3b), step S160 directly combines the two divided images 208, i.e. the upper one and the lower one, to generate the combined image 500 (as shown in FIG. 5b); and when each of the divided images 208 contains the aforementioned overlapped section 400, which means that the divided images 208 are generated through the aforementioned steps S122 and S124, step S160 combines the two divided images 208 through removing a part 402 of the overlapped section 400 to thereby generate the combined image 600 (as shown in FIGS. 6a and 6b). As to the case of FIGS. 6a and 6b, step S160 first removes a half 402 of the overlapped section 400 containing the border in each of the divided images 208 to thereby remove the probably existed artifacts therein and accordingly generate two combination-awaited images 602; after removal, in the combination-awaited image 602 of the left divided image 208, the remaining half 404 of the overlapped section 400 can be used to recover the removed part 402 of the right divided image 208, and since the remaining half 404 nowhere contains any border, the artifacts due to the imperfect border no longer exist; and similarly, in the combination-awaited image 602 of the right divided image 208, the remaining half 404 of the overlapped section 400 can be used to make up the removed part of the left divided image 208, and because the remaining half 404 doesn't contain any border, the artifacts due to the imperfect border nowhere exist. Please note that in the current embodiment the size of the total removed part will be equal to the size of the predetermined overlapped section 400, and therefore the combined image 600 originated from the two division-awaited images 208 has the size equivalent to the size of the scale-down image 204 minus the size of the overlapped section 400.

Briefly, the way for generating the divided images may affect the way for generating the combined image. However, one can always keep the way of generating the divided images the same to consequently make the way of generating the combined image remain constant.

Figure 7A:
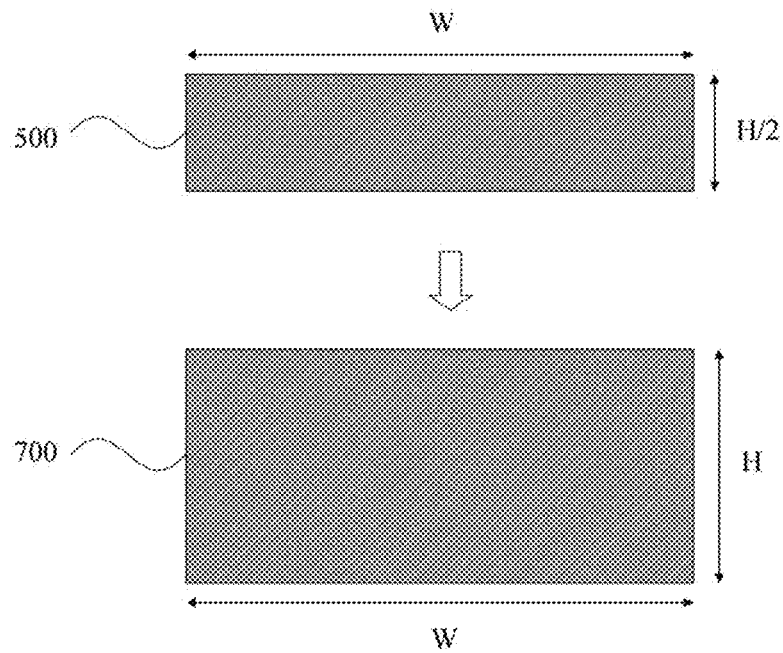
FIG. 7a illustrates an embodiment of enlarging the combined image of FIG. 5a to generate a display image.
Figure 7B:
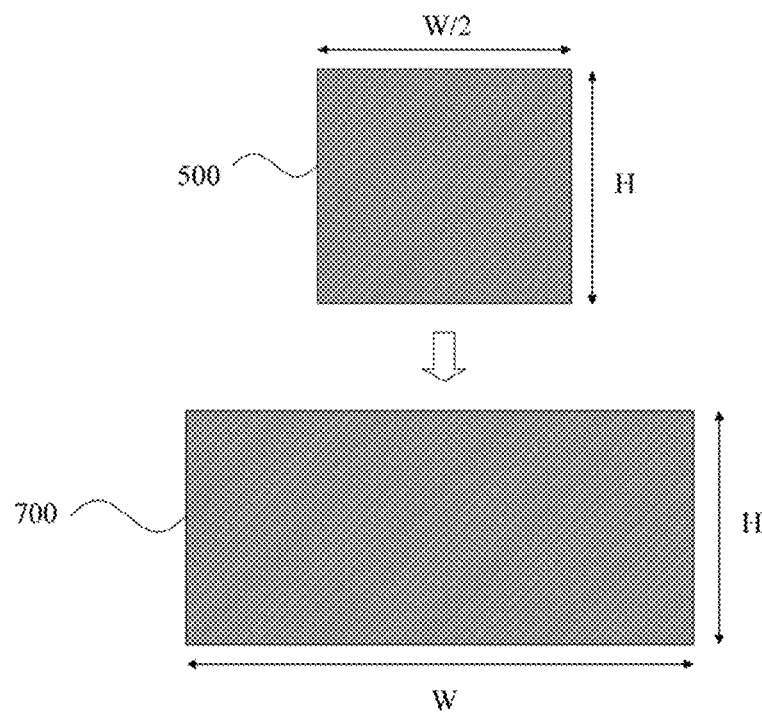
FIG. 7b illustrates an embodiment of enlarging the combined image of FIG. 5b to generate a display image.

Please refer to FIG. 1 again. Step S170 can comprise: generating the display image in consideration of the way for step S160 generating the combined image and/or the way for step S110 generating the scale-down image. To be more specific, please refer to FIGS. 2a, 3a, 5a, 5b, 7a and 7b. When step S160 generates the combined image 500 by directly combining the divided images 208 (as shown in FIG. 5a) and step S110 generates the scale-down image 204 by reducing the height of the source image 200 (as shown in FIG. 2a), step S170 correspondingly enlarges the height of the combined image 500 (through a way like doing interpolation by repeatedly using two sequential horizontal image lines to produce a new horizontal image line for enlargement) to generate the display image 700 (as shown in FIG. 7a); or when step S160 generates the combined image 500 by directly combining the divided images 208 (as shown in FIG. 5b) and step S110 generates the scale-down image 204 by reducing the width of the source image 200 (as shown in FIG. 3a), step S170 enlarges the width of the combined image 500 (through a way like doing interpolation to extend the width of each horizontal image line) to thereby produce the display image 700 (as shown in FIG. 7b).

Figure 8A:
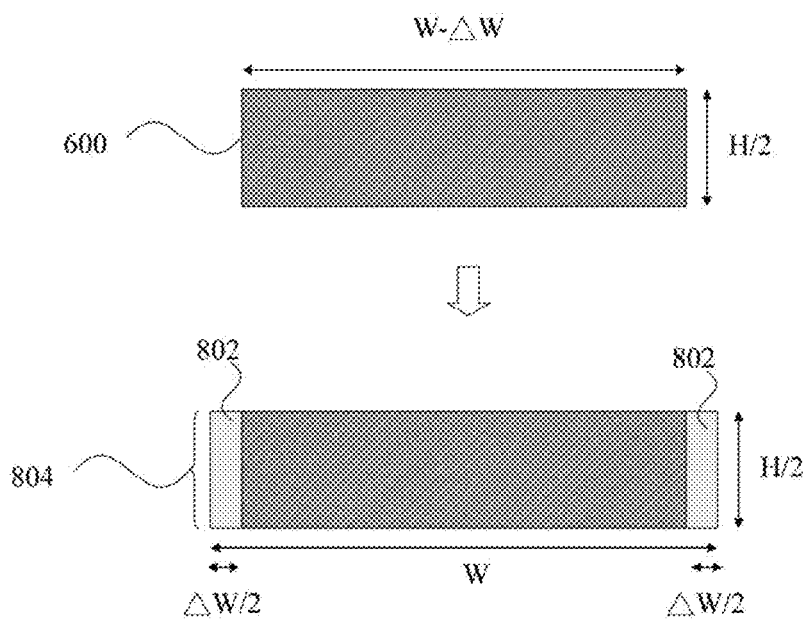
FIG. 8a illustrates an embodiment of adding several imageless sections to the combined image of FIG. 6b to thereby generate an enlargement-awaited image.
Figure 8B:
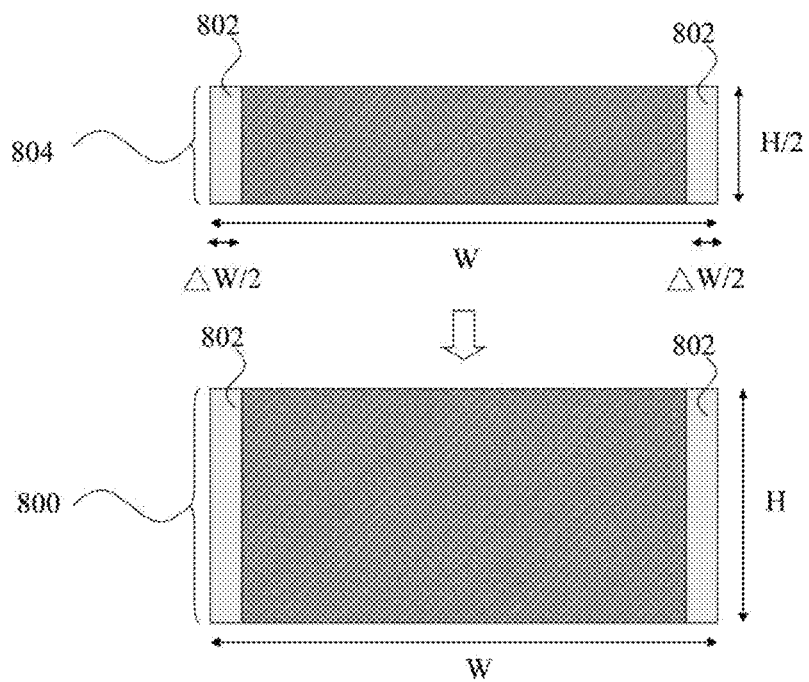
FIG. 8b illustrates an embodiment of enlarging the enlargement-awaited image of FIG. 8a to generate a display image.
Figure 8C:
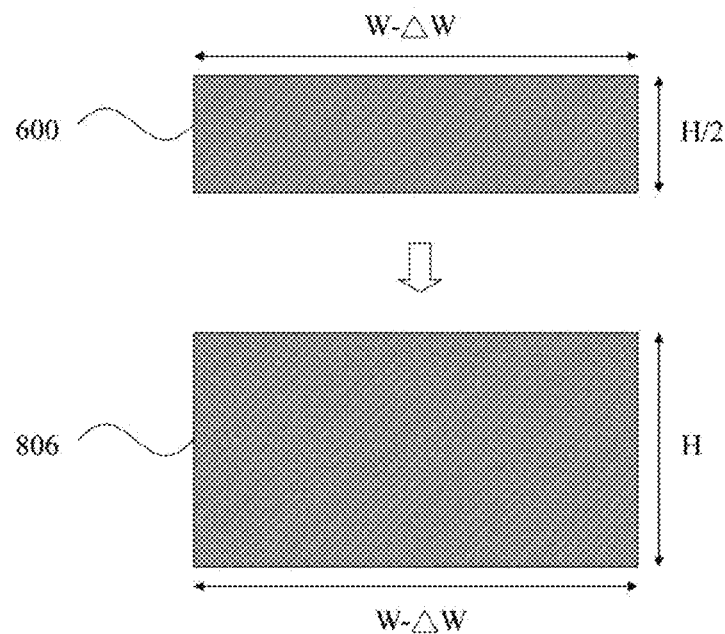
FIG. 8c illustrates an embodiment of enlarging the combined image of FIG. 6b to generate an enlarged image.
Figure 8D:
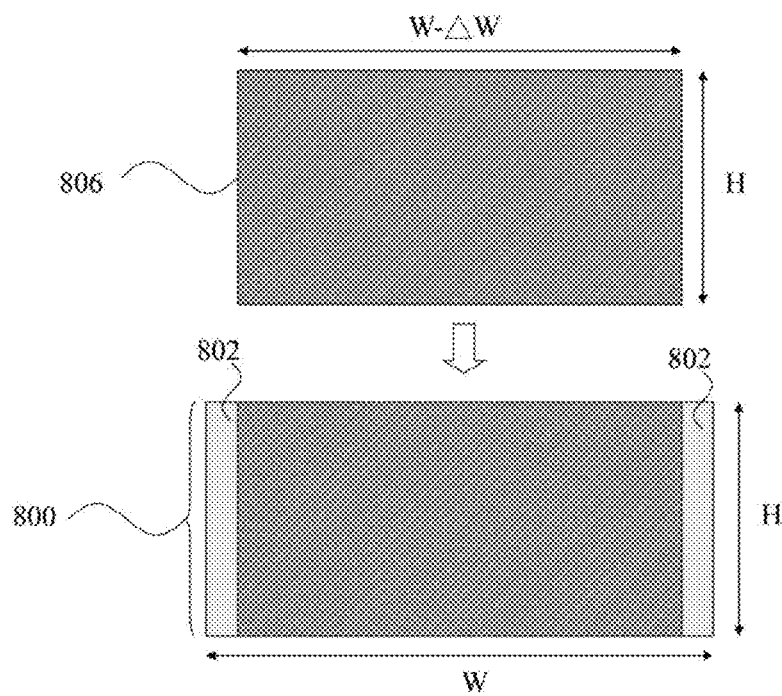
FIG. 8d illustrates an embodiment of adding several imageless sections to the enlarged image of FIG. 8c to thereby generate a display image.
Figure 9A:
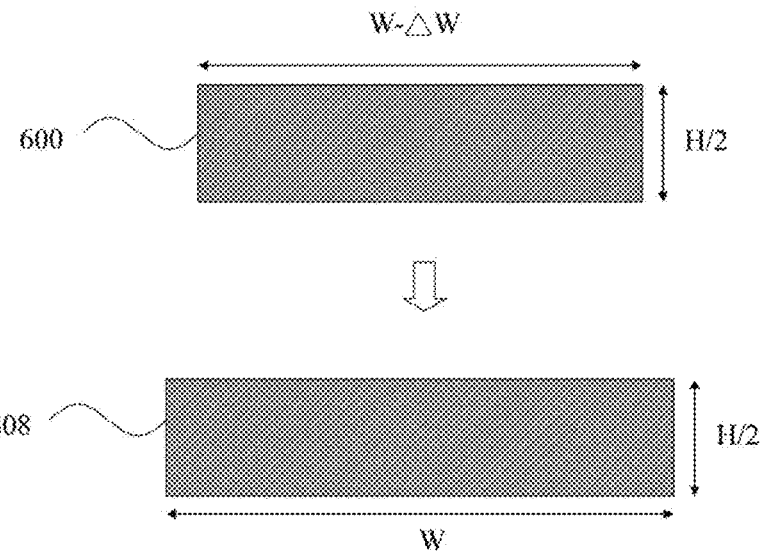
FIG. 9a illustrates an embodiment of enlarging the combined image of FIG. 6b to generate another enlargement-awaited image.
Figure 9B:
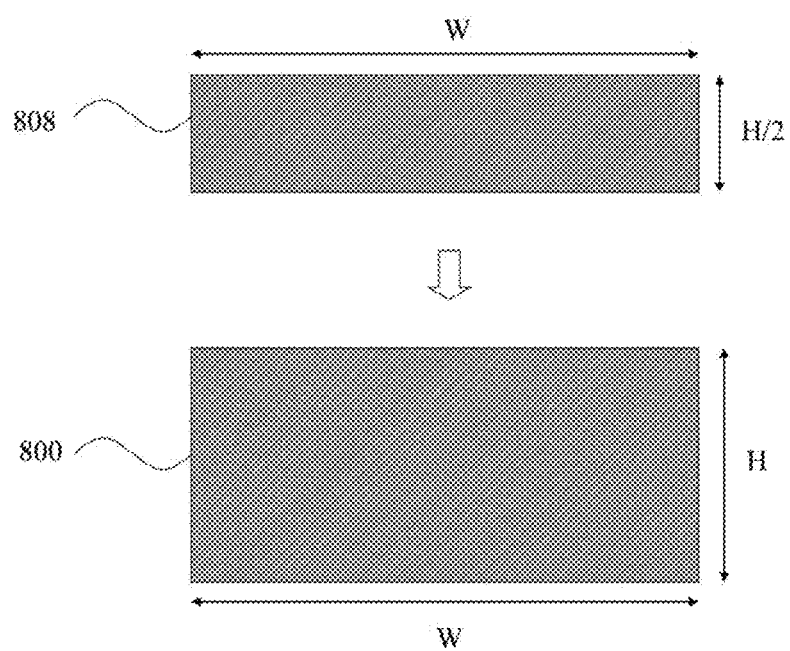
FIG. 9b illustrates an embodiment of enlarging the enlargement-awaited image of FIG. 9a to generate a display image.

Besides, please refer to FIGS. 6a, 6b, 8a, 8b, 9a and 9b. When step S160 combines the two divided images 208 by removing a part of the overlapped section 400 (as shown in FIGS. 6a and 6b) and step S110 generates the scale-down image 204 by reducing the height of the source image, step S170 first fills each side of the combined image 600 with an imageless section 802 (e.g. a black bar with the size of (ΔW/2)×H/2) to thereby produce an enlargement-awaited image 804 (as shown in FIG. 8a), and then step S170 increases the height of the enlargement-awaited image 804 to generate the display image 800 (as shown in FIG. 8b); or step S170 first increases the height of the combined image 600 to generate an enlarged image 806 (as shown in FIG. 8c) and then fills each side of the enlarged image 806 with an imageless section 802 (e.g. a black bar with the size of (ΔW/2)×H) to accordingly generate the display image 800 (as shown in FIG. 8d); otherwise, step S170 first increases the width of the combined image 600 by interpolation to generate another enlargement-awaited image 808 (as shown in FIG. 9a) and then enlarges the enlargement-awaited image 808 to obtain the display image 800 (as shown in FIG. 9b).

Please note that the size of the aforementioned display image could be the same as or different from that of the source image. In other words, as long as the aforementioned image reception device is capable of performing display procedure according to the display image, step S170 can enlarge the combined image, the first mentioned enlargement-awaited image or the second mentioned enlargement-awaited image in a manner relevant or irrelevant to the way for reducing the source image. Please also note that in the description related to FIGS. 6a to 9b, if the precedent step S110 reduces the width of the source image instead of its height to generate the scale-down image, step S170 should be modified correspondingly.

Furthermore, please note that the aforementioned steps S160 and S170 can be executed by a scaler, a scaler and the timing controller thereof, or a timing controller receiving the output of a scaler, wherein both the scaler and the integrated or independent timing controller are included in an image reception device. This indicates that steps S150, S160 and S170 can be carried out by the same circuit (e.g. a scaler) or different circuits (a scaler and a timing controller), or step S150 and steps S160, S170 can be carried out separately. For instance, step S150 can be executed by a scaler while steps S160 and S170 can be executed by a timing controller. Since a person of ordinary skill in the art can appreciate more implementation possibilities in accordance with the disclosure of this specification, similar examples or illustration will be therefore omitted, provided that the specification and enablement requirements are satisfied.

Figure 10:
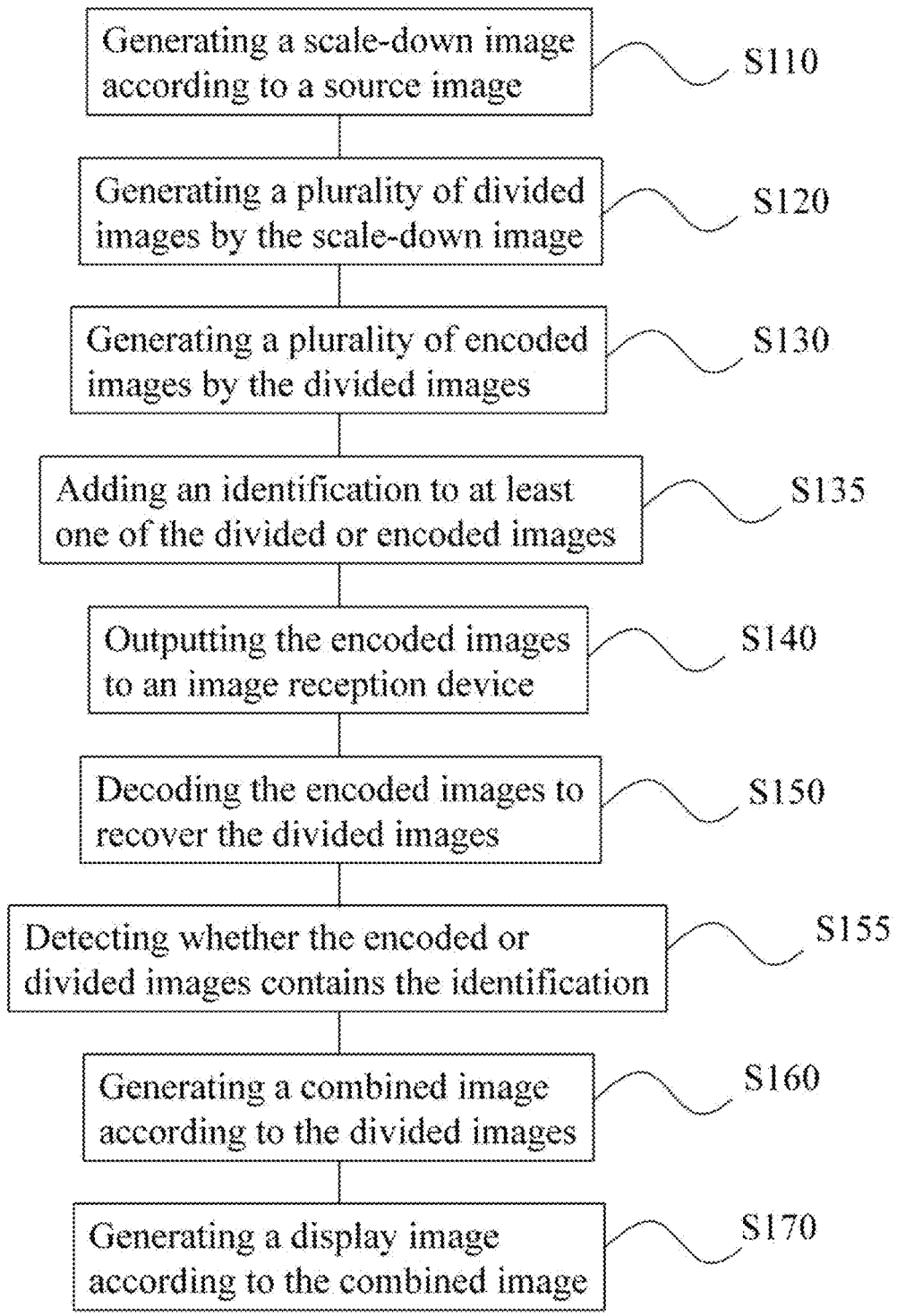
FIG. 10 illustrates another embodiment of the image processing method of the present invention.

Please refer to FIG. 10 which illustrates another embodiment of the image processing method of the present invention. This embodiment is for preventing the aforementioned step S160 from wrongly dealing with the divided images due to misjudging their type or other reasons. More specifically, the embodiment makes use of an identification to assist step S160 and the image reception device in properly processing the divided images. As shown in FIG. 10, compared to FIG. 1, the embodiment further comprises the following steps:

Step S135: using the image output device to add an identification to at least one of the divided images or encoded images, wherein the identification could be a specific word, a tag or any pattern or value that can be recognized by the image reception device for representing the image output processing method of the present invention.

Step S155: using the image reception device to determine whether the plurality of encoded images or divided images contains the identification. If so, the image reception device generates the combined image according to the divided images as described above; if not, the image reception device determines how to take care of the received images according to a predetermined process flow. For example, when the image reception device can't detect the identification from the received images, it may find the received images meeting the format of MVC (Multi-View Coding) by executing the predetermined process flow, and then processes the received images in an appropriate way.

Besides inserting the identification by the manner mentioned above, another embodiment of the present invention has the image output device provide an identification for the image reception device through the aforementioned transmission interface, so as to achieve the same purpose. Please note that the identification is not necessary if the image reception device can appropriately execute the image processing method of the present invention. For instance, the image reception device can be designed from the very first to execute the present invention; or the image reception device can take every potential misjudgment case as the case of the present invention; or the image reception device utilizes other information from the image output device or features like the size and/or amount of the divided images to recognize the present invention.

Please refer to FIG. 1 again. As described before, the image processing method shown in FIG. 1 actually comprises an image output processing method and an image reception processing method. The image output processing method includes steps S110, S120, S130 and S140, and is carried out by the aforementioned image output device; the image reception processing method includes steps S150, S160 and S170, and is executed by the image reception device, wherein step S150 can be treated separately from steps S160 and S170. Please refer to FIG. 10. Similarly, the image processing method of FIG. 10 also comprises an image output processing method and an image reception processing method in which the image output processing method includes steps S110, S120, S130, S135 and S140 and is realized through the image output device, and the image reception processing method includes steps S150, S155, S160 and S170 and is performed by the image reception device, wherein steps S150 and S155 can be performed separately from steps S160 and S170. Please note that each example mentioned before can be applied to the image output processing method and/or the image reception processing method derived from FIG. 10. In other words, one of ordinary skill in the art can make proper changes to the image processing method, image output processing method and image reception processing method by referring to the previous disclosure.

To sum up, the present invention discloses an image processing method, an image output processing method and an image reception processing method for handling extra high-definition images through a device with limited processing capability while such extra high-definition images can not be taken care by the same device executing methods of the prior art. In short, this invention can make the device support images with higher resolution and thus offers a cost-effective solution.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. An image processing method carried out by an image processing system which includes an image output device, a transmission interface and an image reception device, comprising:
using the image output device to generate a scale-down image according to a source image in which the scale-down image has the size smaller than the size of the source image;
using the image output device to generate a plurality of divided images of the same size according to the scale-down image in which each of the divided images has the size smaller than the size of the scale-down image;
using the image output device to compress the divided images so as to generate a plurality of encoded image;
using the image output device to output the plurality of encoded images to the image reception device through the transmission interface;
using the image reception device to decompress the plurality of encoded images to recover the plurality of divided images; and
using the image reception device to generate a display image according to the plurality of divided images in which the display image has the size larger than the size of any of the divided images.

2. The image processing method of claim 1, wherein the step of generating the scale-down image comprises:
reducing at least one of the width and height of the source image according to an image reduction rule to thereby generate the scale-down image.

3. The image processing method of claim 1, wherein the step of generating the scale-down image comprises:
generating the scale-down image with the size equal to the half size of the source image.

4. The image processing method of claim 1, further comprising:
having the image output device trim or resize an original image in consideration of a display size of the image reception device to thereby generate the source image.

5. The image processing method of claim 1, wherein the step of generating the scale-down image comprises:
determining a reduction ratio or manner for generating the scale-down image according to a parameter related to the processing capability of the image reception device.

6. The image processing method of claim 1, wherein the step of generating the plurality of divided images comprises: generating each of the divided images with incomplete image lines in comparison with the source image.

7. The image processing method of claim 1, further comprising:
using the image reception device to generate a combined image or a plurality of enlarged images according to the plurality of divided images; and
using the image reception device to enlarge the combined image or combine the plurality of enlarged images to generate a display image or assist in generating the display image.

8. The image processing method of claim 7, wherein the step of generating the plurality of divided images comprises:
reducing the scale-down image to a division-awaited image with the size equal to the value of subtracting the size of a predetermined overlapped section from the size of the scale-down image; and
generating the plurality of divided images according to the division-awaited image while each of the divided images contains a part or the whole of the predetermined overlapped section.

9. The image processing method of claim 8, wherein the step of generating the combined image comprises:
removing a part of the predetermined overlapped section in each of the divided images, so as to generate a plurality of combination-awaited images; and
combining the plurality of combination-awaited images to generate the combined image.

10. The image processing method of claim 7, wherein the step of generating the combined image comprises a step of combining the plurality of divided images in consideration of the way for dividing the scale-down image, and the step of generating the display image comprises a step of enlarging the combined image in consideration of the way for generating the scale-down image.

11. The image processing method of claim 7, wherein the step of generating the plurality of enlarged images comprises a step of enlarging the plurality of divided images in consideration of the way for generating the scale-down image, and the step of generating the display image comprises a step of combining the plurality of enlarged images in consideration of the way for dividing the scale-down image.

12. The image processing method of claim 1, further comprising:
using the image output device to add an identification to at least one of the divided images or encoded images in which the identification represents an image output processing method; and
using the image reception device to determine whether the encoded images or divided images comprises the identification, and generate the display image according to the divided images if the identification is detected.

13. The image processing method of claim 1, further comprising:
having the image output device provide an identification for the image reception device through the transmission interface in which the identification implies an image output processing method; and
having the image reception device generate the display image according to the plurality of divided images in light of the identification.

14. An image output processing method carried out by an image output device, comprising:

using the image output device to generate a scale-down image according to a source image while the size of the scale-down image is smaller than the size of the source image;

using the image output device to generate a plurality of divided images including a first and a second halves of the scale-down image;

using the image output device to compress the divided images so as to generate a plurality of encoded images; and having the image output device output the plurality of encoded images to an image reception device through a transmission interface.

15. The image output processing method of claim 14, wherein the step of generating the scale-down image comprises:

reducing at least one of the width and height of the source image according to an image reduction rule to thereby generate the scale-down image.

16. The image output processing method of claim 14, wherein the step of generating the scale-down image comprises:

generating the scale-down image with the size equal to the half size of the source image.

17. The image output processing method of claim 14, wherein the step of generating the scale-down image comprises:

determining a reduction ratio or manner for generating the scale-down image according to the processing capability of the image reception device.

18. The image output processing method of claim 14, further comprising:

having the image output device trim or resize an original image according to a display size of the image reception device to thereby generate the source image.

19. The image output processing method of claim 14, wherein the step of generating the plurality of divided images comprises:

generating the plurality of divided images according to the scale-down image in which each of the divided image has incomplete image lines in comparison with the scale-down image.

20. The image output processing method of claim 14, wherein the step of generating the plurality of divided images comprises:

reducing the scale-down image according to the size of a predetermined overlapped section to thereby obtain a division-awaited image; and generating the plurality of divided images according to the division-awaited image while each of the divided image contains a part or the whole of the predetermined overlapped section.

21. The image output processing method of claim 14, further comprising:

using the image output device to add an identification to at least one of the divided images or encoded images in which the identification represents the image output processing method.

22. The image output processing method of claim 14, further comprising:

having the image output device provide an identification for the image reception device through the transmission interface, wherein the identification represents the image output processing method.

23. An image reception processing method carried out by an image reception device for receiving and processing a plurality of encoded images from an image output device in which the plurality of encoded images is derived from a source image, comprising:

using the image reception device to decompress the plurality of encoded images to generate a plurality of divided images including a first and a second halves of a scale-down image of the source image;

using the image reception device to generate a combined image or a plurality of enlarged image according to the plurality of divided images; and using the image reception device to enlarge the combined image or combine the plurality of enlarged images to generate a display image or assist in generating the display image.

24. The image reception processing method of claim 23, wherein the step of generating the combined image or the plurality of enlarged images is executed in consideration of the way for generating the divided images.

25. The image reception processing method of claim 23, further comprising:

using the image reception device to determine whether the plurality of encoded images or divided images includes an identification which implies an image output processing method.

26. The image reception processing method of claim 23, further comprising:

using the image reception device to receive an identification from the image output device in which the identification represents an image output processing method.

27. An image processing method carried out by an image processing system which includes an image output device, a transmission interface and an image reception device, comprising:

using the image output device to generate a plurality of divided images of the same size according to a source image in which each of the divided images has incomplete image lines in comparison with the source image;

using the image output device to compress the divided images so as to generate a plurality of encoded images;

having the image output device output the plurality of encoded images to the image reception device through the transmission interface;

using the image reception device to decompress the plurality of encoded images to recover the plurality of divided images; and using the image reception device to generate a display image according to the plurality of divided images.

28. The image processing method of claim 27, further comprising:

using the image output device to add an identification to at least one of the divided images or encoded images in which the identification represents an image output processing method; and using the image reception device to detect the identification and generate the display image according to the plurality of divided images if the identification is detected.

29. The image processing method of claim 27, further comprising:

using the image output device to provide an identification for the image reception device through the transmission interface wherein the identification represents an image output processing method; and having the image reception device to generate the display image according to the plurality of divided images on the basis of the identification.

30. An image output processing method carried out by an image output device, comprising:
- using the image output device to generate a plurality of divided images including a first and a second halves of the same size according to a source image while each of the divided images has incomplete image lines in comparison with the source image;
- using the image output device to compress the divided images so as to generate a plurality of encoded images; and
- having the image output device output the plurality of encoded images to an image reception device through a transmission interface.

31. The image output processing method of claim 30, further comprising:
- using the image output device to insert an identification into at least one of the plurality of divided images or encoded images in which the identification represents the image output processing method.

32. The image output processing method of claim 30, further comprising:
- having the image output device provide an identification for the image reception device through the transmission interface in which the identification represents the image output processing method.

33. An image reception processing method realized by an image reception device for receiving and processing a plurality of encoded images from an image output device in which the plurality of encoded images is derived from a source image, comprising:
- using the image reception device to decompress the plurality of encoded images to obtain a plurality of divided images including a first and a second halves of the same size;
- using the image reception device to detect whether the plurality of encoded images or divided images contains an identification, or having the image reception device receive the identification from the image output device, wherein the identification indicates an image output processing method; and
- if the identification is detected or received by the image reception device, having the image reception device generate a display image in consideration of the image output processing method.

* * * * *